United States Patent Office 3,539,362
Patented Nov. 10, 1970

3,539,362
PROCESS FOR PREPARING VACUUM
PACKED FRIED FOODS
Rene Laurens, Holly Hill, Fla., assignor to Rene Foods, Incorporated, Norristown, Pa., a corporation of Pennsylvania
No Drawing. Continuation-in-part of application Ser. No. 579,231, Sept. 14, 1966. This application Jan. 31, 1968, Ser. No. 701,834
Int. Cl. A23b 1/10; A23l 3/00
U.S. Cl. 99—187        9 Claims

ABSTRACT OF THE DISCLOSURE

Fried meat products such as breaded fried chicken can be provided in a dry vacuum pack in accordance with a process in which the moisture content of the meat is reduced, the surfaces of the meat are sealed to the passage of moisture with gelled edible vegetable gum, the meat is breaded and fried, placed in a vacuum pack in the dry state and heat sterilized after sealing.

CROSS REFERENCES TO RELATED APPLICATIONS

This application is a continuation-in-part of my earlier copending application Ser. No. 579,231 filed Sept. 14, 1966 and now abandoned.

BACKGROUND OF THE INVENTION

This invention relates to a process for making vacuum packed foods such as meat, fish and seafood, particularly when prepared in breaded and fried form, with superior properties. The invention is especially applicable to a process for making vacuum packed fried chicken which can be served in a crisp, fresh tasting and firm condition after storage in the vacuum pack.

A necessary step in the process of canning any perishable material is the sterilization step. This is most commonly accomplished by subjecting the can, after sealing, to an elevated temperature for a long enough period to assure that microorganisms whose metabolism might cause spoilage are sufficiently destroyed. Where the can is a "dry pack" of a foodstuff which has a significant moisture content, this moisture is partially turned to steam during sterilization, inevitably causing additional cooking of the foodstuff. In the case of some products this effect can be compensated for by adjusting the cooking time of the food in order to provide a finished product cooked to the desired consistency. On the other hand, the inadvertent postcooking effect which necessarily accompanies heat sterilization in the can is a serious impediment in the canning of such foods as breaded and fried meats, etc. This problem is accentuated in the case of certain products, including chicken, shrimp and fish, which, because of their special susceptibility to spoilage when canned, require a relatively long heat sterilization treatment. In the case of fried chicken, for instance, it has been observed that such postcooking readily reaches the point where the meat falls from the bone, leaving an unappetizing mass of bones, skin, overcooked meat, breading and chicken soup in the can.

It is an object of this invention to provide a process whereby fried foods may be vacuum packed and heat sterilized and yet be capable of being served crisp, firm, and fresh tasting upon opening of the container after storage.

It is a further object of this invention to provide a process whereby foods with a significant moisture content may be prepared for canning so as to survive heat sterilization without being overcooked thereby.

Another object of this invention is to provide a fried meat, poultry or seafood product suitable for dry vacuum packing in the fully prepared stage.

Yet another object of this invention is to provide a process for preparing canned fried chicken which, when opened and served, will be in the form of firm chicken parts, the meat adhering to the bone as when freshly fried rather than tending to separate therefrom, and the breading being crisp and adhering to the chicken rather than separating therefrom in a soggy mass.

For the sake of economy of expression the term meat will be used in this specification to denote not only meat, but also poultry, fish, seafood, shrimp and the like. Similarly the use of the term frying in this specification will be understood to denote primarily deep-fat frying and pan frying, but also any of the other processes for the heat-fixing of proteins, such as boiling, broiling, baking and the like.

SUMMARY OF THE INVENTION

The process of this invention involves substantially sealing the exterior surfaces of the meat to the passage of moisture by gelling thereon an edible high polymer before frying and vacuum packing of the meat. The polymer gel may be present in the form of a thin film. If the meat has a relatively high moisture content, this must be reduced—before the exterior surfaces of the meat are sealed—to a level which is acceptable for the purposes of this invention. If the moisture content is above this level it is found that after subsequent heat sterilization the fried meat product is deteriorated due to overcooking. One possible explanation for this phenomenon is that if the surfaces of a meat with too high a moisture content are sealed with the polymer gel, the subsequent heat sterilization will result in the conversion of so much of this moisture to steam that the "seal" will be broken, permitting moisture to bleed out of the meat and permitting the steam thus formed to overcook the meat.

Whether or not this explanation is the correct one, it has been observed that for each meat product subjected to the process of this invention there is a level of moisture content—referred to hereinafter as the "desired" moisture content—at which to seal the surfaces of the meat in order to assure that the process will yield an acceptable final product, i.e. one which is not overcooked. If meat with a moisture content substantially above this desired level is used, the product will be overcooked.

For virtually all of the types of meats subjected to the process of this invention it is found that the moisture content must be reduced from the level found in the raw meat to the "desired" level before the surfaces of the meat are sealed.

Sealing of the meat surfaces is then accomplished by depositing a layer of a high polymer on the exposed surfaces of the meat and gelling this polymer. The polymer can be applied in the form of an aqueous solution or dispersion of a water soluble high polymer, such as a vegetable gum. The properties required of this polymer are that it be edible and that it form a gel which is stable at the pH of the meat and under the subsequent processing conditions. Then the meat is prepared for frying, as by breading, and is fried. The fried meat is then dry packed, sealed under vacuum and heat sterilized according to standard procedures. The presence of breading on the meat serves to prevent the gelled sealant from being destroyed as a result of direct contact with the hot interior surface of the can during sterilization.

Application of the sealing solution (which may actually be a dispersion) to the meat surfaces may be accomplished by any technique found most convenient, such as spraying or dipping. It is found, however, that superior results are obtained if the meat surfaces are above a certain temperature—generally about 140° F. or greater—when the sealant is applied thereto. A possible explanation for this is that the meat is more porous in this hot condition, and that the sealant is more effective if gelled on porous surfaces in sealing those surfaces to the passage of moisture.

DESCRIPTION OF SOME PREFERRED EMBODIMENTS OF THE INVENTION

"Desired" moisture content

The moisture content of chicken in the raw state is higher than the desired value for the process described herein. Hence it must be reduced, as by blanching or parboiling, before the sealing agent is applied.

The moisture content of raw chicken varies widely depending on the age of the chicken, the weight of the chicken, how recently it was killed, and the manner of its storage after killing. Freshly killed Leghorn laying hens may have a moisture content of 40–55% by weight, whereas in young friers the moisture content may be as high as 65% by weight. What is more, if the slaughtered chicken is placed in a cooling tank according to a commonly followed procedure, it picks up additional moisture. U.S. Department of Agriculture standards permit an 8% weight gain in the cooling tank.

As an example of the amount of moitsure reduction necessary in chicken in order that it reach the desired value, consider a 3¼ lb. frier which is placed whole in a cooling tank upon slaughtering. The chicken gains the maximum permissible weight in the cooling tank. Moisture reduction is by parboiling the whole chicken. At least a 12% weight reduction must be effected during parboiling before the desired level is reached. If less moisture is removed, the coating of sealant on the chicken parts will blister during subsequent hot processing of the chicken and will permit moisture to "bleed" out of the chicken, making it impossible to process the chicken in accordance with the process of the invention. In fact, the inability of the gelled polymer coating to seal the surfaces of the chicken to the passage of moisture if less water than this minimum figure is removed during parboiling may be observed in the amount of splashing and splattering of fat during frying, an indication that moisture is bleeding out of the chicken. Although a 12% weight reduction is the minimum permissible for this chicken, about a 19% weight reduction during parboiling is greatly preferred. A practical maximum is 23% weight reduction during parboiling. If more moisture than this is removed, the final product will be too dry—it will in fact be leathery.

The moisture content of other meats subjected to the process of this invention must, in most cases, also be reduced before the sealing agent is applied. Thus, in the case of shrimp, blanching by dipping into boiling water for one to two minutes has been found satisfactory. In the case of fish such as fluke, blanching with wet steam for 3 minutes so that the fish reaches a temperature of 200° F., yields a good product. Veal cutlets have been made successfully in accordance with this invention when sliced from a piece of veal which had been subjected to wet steam for 10 to 15 minutes, so that the meat was also made firm enough to cut thin slices therefrom.

When steam is used for the blanching or parboiling step, it is preferable to use wet steam. Dry or superheated steam tends to damage this meat, especially in the case of chicken.

In general if the meat parts, after being sealed and breaded, cause a great deal of splashing and splattering of fat in the fryer, it is an indication that the moisture content is above the desired value. Of course, some small amount of fat splattering may be due to moisture in the breading, but vigorous splattering is an indication that moisture is "bleeding" out of the meat.

Sealing

The sealing agent to be used in the process of this invention may be an edible high polymer which dissolves in water and which forms a gel which is stable at the pH of the particular meat product being processed. For example, chicken with a pH of approximately 6.5 must be sealed with a product which forms a stable gel in this slightly acid range. Other food products have other pH values. It will be understood by those skilled in this art to determine the pH value of the meat to be subjected to this invention and to select a sealing material therefor which will form a stable gel at that pH. If the pH of the particular food product changes during cooking, the gel must be stable in that entire range of pH.

Certain of the vegetable gums are highly suitable for use as sealing agents in this invention. The chemical structure of this class of naturally-occurring high polymers is described in R. L. Davidson and M. Sitting "Water-Soluble Resins," Reinhold 1962 as ". . . high polymeric saccharides in which hexose, pentose and uronic acid units are linked with one another. Little is known of the mode of linkage." Animal products such as gelatin, on the other hand, are proteins (pp. 5–6).

The physical behavior of these materials as regards their solubility and gel-forming capacity is described in C. L. Mantell, "The Water-Soluble Gums," Reinhold, 1947:

"The designation of 'water-soluble gums' is a misnomer in many ways as the materials are not soluble in the strictly scientific sense as salt, sugar and other crystallizable materials are soluble; the gums are not crystalloids but colloids. They do not show crystal form, but are in the strict sense amorphous, they have neither melting point nor freezing point nor boiling point characteristics.

". . . These materials are all water-loving colloids—they may apparently dissolve, but actually disperse or swell or absorb water to form commercially valuable and interesting substances. They are hydrophilic and organic solvent-phobic. The resinous materials in contrast to the gums are hydro-phobic and organic solvent-philic.

". . . If the sol-to-gel transformation can be repeated in gels by a suitable choice of conditions, they are considered as 'reversible' gels. If, after setting reliquification is not possible other than by indirect means, these are called 'irreversible gels.' The irreversible gels are most frequently of the emulsoidal type." (Pp. 1–8.)

The formation of an irreversible gel by a material employed as a sealing agent in the process of this invention assures that the gel will not be redissolved during the subsequent processing steps by the moisture present in the meat. The fact that the sealing agent is organic solvent-phobic assures that it will not be appreciably dissolved by the fat used in the deep-frying of the meat.

The vegetable gums are frequently classed according to their source. One class particularly useful for the purposes of this invention are the "seaweeds," so called because they are made from algae and other water plants, which includes agar, algin and carrageenin gum. These are excellent sealing agents for meats for the purposes of this invention. Agar is particularly desirable for the purposes of this invention because it forms a gel which is stable over a fairly wide pH range. Other gums of this class, although less readily available, may also be used. These include the fucoidan and laminaran gums.

Another class of gums which may be used in this invention are the plant exudates, including gum arabic, ghatti gum, karaya gum and gum tragacanth. Certain other gums are found to form gels which do not remain stable during the subsequent processing of the meat. Such gums, including plant seed gums such as guar gum and locust bean gum and plant extracts such as pectin and ti gum, can not be used by themselves as sealing agents in this invention. However, some of these may be mixed with other gums such as certain of the seaweeds described above to prepare sealing materials useful in this invention.

Certain synthetic and modified natural high polymers are also highly suitable as sealing agents in this invention. These are the polymeric materials which are edible and which form gels which will remain stable at the pH of the meat and during its subsequent processing. Particularly useful among these is carboxymethylcellulose (CMC), a chemical derivative of cellulose from which stable water dispersion can be prepared. According to Davidson et al. (supra), such water dispersions of CMC "can be used to form strong, clear water-insoluble films that are resistant to oils, greases and organic solvents." Gels of water dispersions of CMC are irreversible gels and thus highly desirable for the purposes of this invention. An example of a grade of CMC which may be used is Hercules Cellulose 201.

Some of these polymeric materials in gel form make coatings which are very hard. This is true, for instance, of gum arabic and agar-agar. A mixture of 80 parts by weight agar-agar and 20 parts by weight of gum arabic is particularly useful in giving hard coatings. On the other hand, others of those polymers form rather soft gels, as for instance the seaweeds, locust beam gum and CMC. A combination of 20 parts by weight locust bean gum, 60 parts by weight gum arabic and 20 parts by weight of CMC is very desirable in producing coatings with a combination of properties which are very useful in the process of this invention. Another such advantageous combination is a mixture of 60 parts by weight gum arabic, 10 parts by weight agar-agar and 30 parts by weight of seaweed.

The sealing agent may be applied to all of the exposed surfaces of the meat parts (which have the "desired" moisture content) in the form of an approximately one percent by weight to three and one-half (1%–3½%) solution either by spraying it on the exposed usrfaces of the meat or by dipping the meat into the solution for at least a few seconds, as for example for one quarter to one half minute. Less than a one percent weight gain is experienced by the meat during this dipping process.

It is preferable that the sealing agent be applied to the exposed surfaces of the meat while they are hot— generally about 140° F. or more. Inasmuch as the meat is generally heated in order to adjust the moisture content thereof to the desired value before sealing, a convenient procedure is to apply the sealant to the meat immediately after the moisture reducing step of blanching or parboiling and before the meat has cooled down.

After the solution of sealing agent is applied to the meat it may be exposed to the atmosphere for a brief period. Actually an exposure of two minutes or even less is sufficient, but exposure of up to six minutes or even longer may be employed. During this exposure the excess sealing solution drains off and the sealing agent gels to seal the surfaces of the meat to the passage of moisture. After this treatment, the meat may feel sticky as long as it is warm, but will feel dry when it cools off.

Subsequent processing is according to standard procedures which will be identified hereinbelow in the specific examples for making various products. The meat, its surfaces now sealed to the passage of moisture, may next be prepared for frying as by breading or padding with flour or the like.

In the case of breading, the meat parts are dipped in a batter solution which may consist of 70 percent by weight whole egg, 10 percent by weight flour, 10 percent by weight seasoning and 10 percent by weight water. As will be readily understood by those skilled in this art, this may be accomplished by moving the parts through a vessel containing this batter solution on a conveyor.

The parts may then be breaded by contacting them with a mixture comprising 95 percent by weight bread crumbs or cracker crumbs and 5 percent dry mixed spices, such as bayleaf, etc. Any other application of batter, dough or composition including bread crumbs, cracker meal, matzoh meal, cereal, flour or the like may, of course, be used instead. Again, in a commercial installation the breading step may be performed on a breading machine.

The meat is then ready for frying. In a commercial operation this is conveniently accomplished in an automatic fryer in which the breaded parts are submerged in, and moved through, a bath of cottonseed or corn oil at approximately 350–375° F. for the desired length of time while held on a traveling belt or between a pair of traveling belts. The optimum frying time must be determined by visual inspection of the meat, i.e. by determining when it has arrived at a golden brown color. For chicken, this time period is usually between one and one and one-half minutes, depending upon the humidity of the atmosphere in which the chicken was prepared for frying. The less humid this atmosphere, the shorter the frying period required to reach the optimum golden brown color. It is useful to incorporate a small quantity of an edible anti-oxidant in the frying oil. This acts as a preservative for the fat and also for the meat. Incorporating in the fat to the extent of one-half of 1 percent of its weight of the commercial anti-oxidant Tinox serves this purpose well.

The fried parts are then moved to a packing table where they are placed in suitable vacuum packing containers, as for instance 12 oz. aluminum coated cans. The filled cans are then conveyed to a vacuum sealing machine where a vacuum of 20 inches of mercury is applied and the cans are sealed.

The sealed cans are then ready for heat sterilization. This can be accomplished in a pressure cooker where they are subjected to an elevated temperature for a specified period of time for sterilization. The precise temperature and time required may vary from product to product and may be specified by quality regulatory organizations. In the case of fried chicken, the cans may be held at 245 to 250° F. for 80 minutes or at 260° F. for 60 minutes. An external pressure of 20 p.s.i. in the case of the lower temperature and 21 p.s.i. in the case of the higher temperature must be applied to the cans during this step, lest the cans be bulged by the heat expansion of their contents.

During the heat sterilization of the packed cans, the breading serves sufficiently to insulate the gelled vegetable gum on the exposed surfaces of the chicken parts which happen to be in contact with the can surface to protect this gel from heat deterioration. Maintaining this water-impervious gel intact is, of course, essential in order to prevent moisture from the chicken from being turned into steam which would overcook the chicken. Without the presence of the layer of breading, the gelled polymer on the surfaces of the meat may tend to stick to the can at the sterilization temperature of 245–260° F. and to rip off when subsequently removed.

For the practice of this invention, it is only necessary to deposit the sealing agent on the exposed surfaces of the meat. No penetration of the fibers of the meat thereby need be sought by special techniques such as injection. For this reason, mere dipping of the meat in a solution of the sealant or spraying the exposed surfaces of the meat with the solution is sufficient. On the other hand, any application of the vegetable gum to the meat which fails to result in the formation of water-impervious gel at the exposed surfaces thereof is insufficient for the purposes of this invention. When used in accordance with this invention, the edible high polymer sealants do not in any way change the flavor of the meat products, their presence being undetectable by taste.

EXAMPLE 1

Fried chicken

Whole eviscerated Leghorn chicken is boiled in a pot at atmospheric pressure for one hour and twenty minutes. The chicken is then cut at the joints and the breast is quartered to produce individual portions and is allowed to cool.

A dry blend of 2 parts locust bean gum, 6 parts gum arabic and 2 parts carboxymethylcellulose Hercules, together with 10 parts of a spice mixture comprising spice, salt, monosodium glutamate, onion, pepper, celery, garlic and sugar is prepared and slowly added to about 375 parts of warm (140° F.) water with good agitation. The solution is then allowed to cool.

The chicken parts are placed in a wire basket and dipped in the solution for 2 minutes. Then the basket is withdrawn and the parts are shaken off.

The individual pieces of chicken are then breaded in accordance with standard techniques, being dipped in flour, eggs and a mixture of bread crumbs, corn starch and flour, and fried in cottonseed oil at 375° F. for 1 to 1½ minutes, until the color is golden brown.

The chicken at this point is almost fully cooked right through to the bone, being only slightly underdone. The individual pieces of fried chicken are now placed in aluminum enameled cans which are then sealed with a vacuum of 15 to 20 inches. The cans are loaded into a retort where they are held at 248–250° F. for 80 minutes under 15–16 p.s.i. gauge pressure. Subsequently, the cans are cooled under the same pressure before being unloaded from the retort.

Even after intentional rough handling of the cans consisting of repeatedly hurling them against a hard surface, placing them on a paint can shaker, subjecting them to storage under arctic as well as elevated temperatures, they were found to contain chicken parts which maintained their integral appearance, the meat remaining on the bone. the skin on the meat, and the breading for the most part still in place and the chicken tasting fresh and tender, yet firm. If the chicken parts are warmed-up upon removal from the can, the crispness which they had just after frying is also restored.

EXAMPLE 2

Fried chicken

Young fryers are cut up into portions and placed on wire trays so that each part is separated from every other part. The trays are loaded, one over the other, on a dolly so that a space is maintained between trays. The dolly on which the trays are loaded is placed in a steam cabinet in which a plurality of nozzles direct jets of wet steam at 212° F. onto the chicken on the trays. The condensate drips from tray to tray to the bottom of the cabinet from where it is permitted to flow to a holding tank. This treatment is continued for 10 to 20 minutes, or until the meat at the center reaches a temperature of about 210° F. At this point, the total weight loss of the chicken is about 19%.

The contents of the holding tank, which at this point is a weak chicken soup, is now made into a sealant solution by adding to 50 gallons of the liquid 6 lbs. gum arabic, 2 lbs. carboxymethylcellulose, Hercules (CMC) and 2 lbs. locust bean gum dry blended with 10 lbs. of a spice mixture like that described herein above while stirring with a high speed agitator. The liquid should be at about 140° F. to facilitate solution of the gums. If the weather is particularly humid, 7 lbs. gum arabic, 1½ lbs. CMC and 1½ lbs. of locust bean gum may be used in the preparation of the solution.

The doors of the steam cabinet are now opened to release the steam therein, the chicken cooling to about 200° F. Then the sealant solution is pumped over the chicken through the same nozzles used to inject steam into the cabinet, the solution again dripping from tray to tray to the bottom of the cabinet from where it is recirculated through the nozzles. The recirculation of this approximately 140° F. sealant solution ultimately cools the chicken parts to about 135° F.–145° F. At this point the dolly is removed from the cabinet and the chicken is removed from the trays.

Optionally, the parts may now be subjected to a second application of sealant solution, which can be of the same composition as that used above. In this manner, any heretofore unsealed portions of the surface can be coated. This second application may be accomplished by dipping the chicken—which has now cooled to 90°–110° F.—into the sealant solution for a brief period such as 3 seconds, and then removing the excess with an air blower.

Then flour is applied, preferably while the surface of the chicken parts is still tacky. After the application of flour, the surface is no longer tacky and the coating is no longer fragile. Now the chicken is breaded, fried, sealed in 12 ounce cans and sterilized as heretofore. A superior product is obtained.

EXAMPLE 3

Fried shrimp

Fresh shrimp is blanched by being dipped into boiling water for 1 to 2 minutes and is then cooled and permitted to dry. A sealant solution with a gellable polymer content like that in Example 2 is applied to the surfaces of the shrimp by briefly dipping the shrimp in the solution maintained at 120° F. Excess solution is permitted to drain from the shrimp, after which they are dipped in flour, batter and breading, fried for 1½ minutes at 375° F., sealed in 6 ounce cans under vacuum as in the case of the chicken, and held in the retort at 250° F. for 40 minutes under 20 p.s.i. gauge pressure. If the blanching step is omitted, the shrimp have a boardy taste due to overcooking.

EXAMPLE 4

Fish

Fluke is cut into strips which are blanched with wet steam at 212° F. until the fish reaches 200° F., at which point the fish is in the form of fairly firm sticks. After cooling, sealant solution and breading is applied as heretofore described and the fish sticks are fried for 1 minute at 350–375° F. Subsequent handling is also as heretofore described, the sterilization progressing at 260° F. for 40 minutes under 20 p.s.i. gauge pressure.

EXAMPLE 5

Veal cutlet

A piece of veal is blanced with wet steam for 10–15 minutes, whereupon it is firm enough to be sliced on a machine into thin slices. Each of these is then coated with sealant solution as heretofore described and is breaded, fried, canned and sterilized as the other meat products described above.

It will be understood by those skilled in this art that many variations may be introduced in the process of this invention without departing from the spirit thereof, and which are intended to be considered within the scope thereof as defined by the appended claims.

I claim:

1. The process of making firm, vacuum-packed fried chicken comprising heat processing raw chicken to reduce the moisture content thereof to the point that the weight of said chicken is reduced by approximately 12 to 23%, applying to the exposed surfaces of said chicken an aqueous solution of an edible high polymer which forms an irreversible stable gel at a slightly acid pH and in the conditions of subsequent processing, gelling said polymer to substantially seal said surfaces, and subsequently frying and vacuum packing said chicken and subjecting said vacuum-packed chicken to heat sterilization.

2. The process of claim 1 wherein said aqueous solution is applied to said exposed surfaces at a temperature of at least approximately 140° F.

3. The process of preparing a vacuum-packed fried meat product having an edible polymer coating comprising:

heating said meat prior to application thereto of the polymer to reduce the moisture content in said meat to a level such that during subsequent heat processing no appreciable quantities of moisture within the meat will migrate through the polymer coating, applying to the surfaces of said moisture adjusted meat an aqueous solution of an edible high polymer which forms an irreversible gel at the pH of said meat and under the conditions of its subsequent processing, gelling said polymer on said surfaces, and subsequently frying and vacuum packing said meat and subjecting said meat to heat sterilization.

4. The improvement of claim 3 wherein said high polymer is at least one member of the group consisting of carboxymethylcellulose and the vegetable gums.

5. The improvement of claim 4 wherein said high polymer is selected from the group consisting of:
(a) a mixture of 80 parts by weight of agar-agar and 20 parts by weight of gum arabic,
(b) a mixture of 60 parts by weight of gum arabic, 30 parts by weight of seaweed gum and 10 parts by weight of agar-agar, and
(c) a mixture of 60 parts by weight of gum arabic, 20 parts by weight of carboxymethylcellulose and 20 parts by weight of locust bean gum.

6. The process of claim 3 wherein said aqueous solution contains approximately 1 to 3½% by weight of said high polymer.

7. The improvement of claim 3 wherein said meat product is selected from the group consisting of chicken, shrimp, fish and veal cutlet.

8. The improvement of claim 3 wherein said surfaces of said meat are at a temperature of at least approximately 140° F. when said aqueous solution is coated thereon.

9. The improved process of claim 3 further comprising the steps of applying a second coating of an aqueous solution of said high polymer to said surfaces after the gelling of the first coating, and gelling said second coating.

References Cited

UNITED STATES PATENTS

| | | | |
|---|---|---|---|
| 1,971,323 | 8/1934 | Strasburger. | |
| 2,705,677 | 4/1955 | Kruger | 99—107 X |
| 2,745,756 | 5/1956 | Ruff. | |
| 2,785,075 | 3/1957 | Malecki. | |
| 2,927,029 | 3/1960 | Long | 99—169 X |
| 3,266,909 | 8/1966 | Ellis | 99—107 X |

FOREIGN PATENTS

| | | |
|---|---|---|
| 681,052 | 10/1952 | Great Britain. |
| 5,894 | 3/1966 | Japan. |

MAURICE W. GREENSTEIN, Primary Examiner

U.S. Cl. X.R.

99—188